(12) United States Patent
Fujieda et al.

(10) Patent No.: US 11,423,525 B2
(45) Date of Patent: Aug. 23, 2022

(54) INDUSTRIAL PLANT DATA REPRODUCTION DEVICE

(71) Applicant: TOSHIBA MITSUBISHI-ELECTRIC INDUSTRIAL SYSTEMS CORPORATION, Chuo-ku (JP)

(72) Inventors: Hiroyuki Fujieda, Tokyo (JP); Katsuhiro Konishi, Tokyo (JP); Kenji Watanabe, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 176 days.

(21) Appl. No.: 16/757,661

(22) PCT Filed: Nov. 22, 2017

(86) PCT No.: PCT/JP2017/042026
§ 371 (c)(1),
(2) Date: Apr. 20, 2020

(87) PCT Pub. No.: WO2019/102549
PCT Pub. Date: May 31, 2019

(65) Prior Publication Data
US 2021/0201470 A1    Jul. 1, 2021

(51) Int. Cl.
*G06T 7/00*    (2017.01)
*G06T 11/20*    (2006.01)
*G06V 20/52*    (2022.01)

(52) U.S. Cl.
CPC .......... *G06T 7/0004* (2013.01); *G06T 11/206* (2013.01); *G06V 20/52* (2022.01);
(Continued)

(58) Field of Classification Search
CPC ..................... G06T 7/0004; G06T 11/206
See application file for complete search history.

(56) References Cited

U.S. PATENT DOCUMENTS

2004/0030436 A1* 2/2004 Popp .............. G05B 19/40
700/111
2004/0128827 A1* 7/2004 Shimizu ......... H05K 13/0061
29/739
(Continued)

FOREIGN PATENT DOCUMENTS

JP    5-52525 A    3/1993
JP    9-235014 A    9/1997
(Continued)

OTHER PUBLICATIONS

Japanese Office Action dated Mar. 2, 2021 in Japanese Patent Application No. 2019-556020 (with unedited computer generated English translation), 8 pages.
(Continued)

*Primary Examiner* — Yi Yang
(74) *Attorney, Agent, or Firm* — Oblon, McClelland, Maier & Neustadt, L.L.P.

(57) ABSTRACT

An industrial plant data reproduction device includes the following. A process data collection unit collects process data regarding a group of devices and materials to be processed by the group of devices. A video data collection unit collects video data in which an object whose image is to be obtained is captured, the object pertaining to the group of devices. A graphic data storage unit stores in advance graphic data indicative of a motion target position of the object whose image is to be obtained for each material specification. A graphic data selection unit selects the graphic data corresponding to the material specifications included in the process data every time each of the materials reaches the object whose image is to be obtained. A display processing unit outputs synthetic data in which the selected graphic data is overlaid on the video data.

2 Claims, 6 Drawing Sheets

(52) U.S. Cl.
CPC ............... *G06T 2207/10016* (2013.01); *G06T 2207/30108* (2013.01); *G06T 2207/30232* (2013.01); *G06V 2201/06* (2022.01)

(56) References Cited

U.S. PATENT DOCUMENTS

| | | | | |
|---|---|---|---|---|
| 2005/0275834 | A1* | 12/2005 | Silver | ............... G06T 7/0004 356/237.1 |
| 2007/0044531 | A1* | 3/2007 | Liefer | ............... B21D 1/02 72/160 |
| 2012/0120078 | A1* | 5/2012 | Hubbard | ............... G06F 17/40 345/440.2 |
| 2014/0297638 | A1 | 10/2014 | Nojima | |

FOREIGN PATENT DOCUMENTS

| | | |
|---|---|---|
| JP | 2001-47246 A | 2/2001 |
| JP | 2015-114827 A | 6/2015 |
| TW | 201125654 A1 | 8/2011 |
| WO | WO 2014/002176 A1 | 1/2014 |

OTHER PUBLICATIONS

International Search Report dated Dec. 26, 2017 in PCT/JP2017/042026 filed on Nov. 22, 2017, citing documents AA and AO-AR therein, 2 pages.

Taiwanese Office Action dated Sep. 10, 2018 in Taiwanese Patent Application No. 107100908 (with partial English translation), citing document AS therein, 9 pages.

Japanese Office Action dated May 18, 2021 in Japanese Patent Application No. 2019-556020 (with unedited computer generated English translation), 7 pages.

International Preliminary Report on Patentability and Written Opinion dated Jun. 4, 2020 in PCT/JP2017/042026 (English Translation only), 10 pages.

Indian Office Action dated Nov. 30, 2021 in Indian Patent Application No. 202017017516, 7 pages.

* cited by examiner

INDUSTRIAL PLANT DATA REPRODUCTION DEVICE

FIELD

The present invention relates to an industrial plant data reproduction device.

BACKGROUND

Industrial plants are known which produce materials and resources required in industrial activities (steel plant, power plant, oil plant, chemical plant, etc.). A plant monitor and control system of an industrial plant includes a configuration in which an input and output unit (I/O), to which numerous field devices (including actuators and sensors) constituting a plant are connected via a control network, and a programmable logic controller (which is hereinafter referred to as PLC) which controls the numerous field devices are interconnected.

Input and output signals of the PLC and the input and output unit are referred to as process data. A large-scale plant such as a steel plant has thousands of or tens of thousands of input and output points, and numerous and various pieces of process data are involved. These pieces of process data are collected by a data reproduction device which has a data collection function and a data reproduction function, and used in data analysis in tests, adjustments, and operations, or in the event of a failure.

A data reproduction device of a conventional plant monitor and control system (for example, see PTL 1) is connected to a control network to collect pieces of process data that have undergone temporal changes on the control network. An operator can recognize the status of the industrial plant by displaying the pieces of process data collected at the same time point.

CITATION LIST

Patent Literature

[PTL 1] WO 2014/002176

SUMMARY

Technical Problem

In the meantime, in addition to displaying the process data, some cases may necessitate displaying in real time video data in which the devices constituting the industrial plant are captured by a monitoring camera and reproducing the process data and the video data in synchronization with each other. A side guide that guides a material to be rolled on the finishing mill entry side of a steel plant and a crop shear that cuts a crop at head and tail ends of the material to be rolled, and the like may be mentioned as examples of the object whose image is to be obtained.

In a case where it should be confirmed whether or not the motion position of the object whose image is to be obtained and has been captured by the monitoring camera is appropriate, simple visual observation of the video data does not go beyond the level of visual inspection, which only realizes low precision. For this reason, it is desirable to provide means that can assist confirmation operation by an operator.

As one scheme, it may be attempted to give a sign on the screen of the data reproduction device on which the video data is displayed by means of a marker or a tape. However, since the materials to be processed in an industrial plant have various sizes, it will be necessary to change the sign depending on the change in the sizes, which will increase operation costs. Also, the position of the sign may be displaced. Also, it is necessary to fix the display position and the display size of a video on the screen to the detriment of flexible operation.

As another scheme, it may also be attempted to give signs on the screen for each of the sizes of the materials. However, it will be necessary for an operator to recognize which sign corresponds to the one that corresponds to the material that is being displayed on the screen. As a result, user-friendliness and precision of confirmation would not be necessarily high for the operator.

As still another scheme, it may further be attempted to use laser sensors for detection of the positions of devices and materials. However, sensors are expensive and their locations of installation are limited.

As has been discussed above, in the analysis of the video data, a lot of cost has been required to confirm the motion position of the object whose image is to be obtained, and the precision of the confirmation has not been high.

The present invention has been made to solve the above-identified or other similar problems and an object of the present invention is to provide an industrial plant data reproduction device that can assist an operator in confirming whether or not a device which is an object whose image is to be obtained is operating properly in the course of analysis of the video data.

Solution to Problem

In order to achieve the above-described object, an industrial plant data reproduction device according to the present invention includes:

a process data collection unit that collects process data regarding a group of devices constituting an industrial plant and materials to be processed by the group of devices;

a video data collection unit that collects video data in which an object whose image is to be obtained is captured, the object pertaining to the group of devices;

a graphic data storage unit that stores in advance graphic data on a material-specification basis, the graphic data indicative of a motion target position of the object whose image is to be obtained;

a graphic data selection unit that selects, from the graphic data storage unit, the graphic data corresponding to the material specifications included in the process data every time each of the materials reaches the object whose image is to be obtained; and a display processing unit that outputs synthetic data in which the graphic data selected by the graphic data selection unit is overlaid on the video data.

As one embodiment, the industrial plant includes a roller table that conveys a material to be rolled which is one of the materials, a side guide arranged in a certain section of the roller table so as to guide the material to be rolled passing the certain section to adjust its position in a width direction, and a monitoring camera that captures an image of the side guide which is the object whose image is to be obtained and outputs the video data;

the graphic data storage unit stores in advance graphic data indicative of a motion target position of the side guide for each of widths of the materials to be rolled; and the graphic data selection unit selects, from the graphic data storage unit, the graphic data corresponding to the width of the next material to be rolled passing the side guide included in the process data every time each of the materials to be rolled reaches an entry side of the side guide.

As another embodiment, the industrial plant includes a roller table that conveys a material to be rolled which is one of the materials, a crop shear arranged in a certain section of the roller table so as to cut an end in a length direction of the material to be rolled passing the certain section in a width direction, and a monitoring camera that captures an image of the crop shear which is the object whose image is to be obtained and the material to be rolled passing the crop shear and outputs the video data;

the graphic data storage unit stores in advance graphic data indicative of a motion target position of the crop shear for each of target cut lengths of the materials to be rolled; and the graphic data selection unit selects, from the graphic data storage unit, the graphic data corresponding to the target cut length of the next material to be rolled passing the crop shear included in the process data every time each of the materials to be rolled reaches an entry side of the crop shear.

As still another embodiment, the display processing unit further generates graph data representing a relationship between the process data and a data collection time and outputs the graph data and the synthetic data in synchronization with each other.

Advantageous Effects of Invention

According to the industrial plant data reproduction device in accordance with the present invention, the graphic data indicative of the motion target position of the object whose image is to be obtained can be automatically changed depending on the material specifications and the graphic data can be displayed in a state where it is overlaid on the video data. By virtue of this, the industrial plant data reproduction device according to the present invention can assist an operator in confirming whether or not the device as the object whose image is to be obtained is operating properly in the course of analysis of the video data.

DESCRIPTION OF EMBODIMENTS

Hereinafter, embodiments of the present invention will be described in detail with reference to the drawings. Note that the same reference sign is given to the corresponding elements in the figures, detailed explanations of which will not be repeated.

First Embodiment

System Configuration

Figure 1:
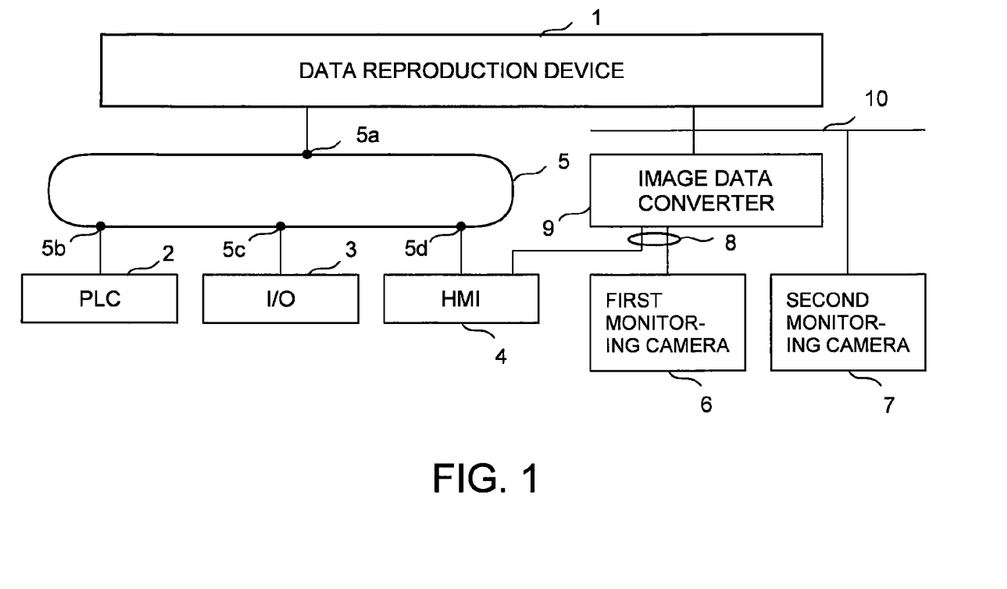
FIG. 1 is a schematic diagram that illustrates a configuration of a plant monitor and control system of an industrial plant according to a first embodiment.

FIG. 1 is a schematic diagram that illustrates a configuration of a plant monitor and control system of an industrial plant according to a first embodiment.

The data reproduction device 1 is connected via a control network 5 to an input and output unit (I/O) 3 which is connected to a group of devices constituting the industrial plant (including actuators and sensors); a programmable logic controller (PLC) 2 that controls the group of devices; and a human-machine interface (HMI) 4 which is a monitoring and control device used by an operator for continuous operation and monitoring of the industrial plant.

The control network 5 has a plurality of nodes having a common memory, and pieces of data on the common memory are synchronized with each other by periodic broadcast transmission among the multiple nodes. By virtue of this, the same memory space is shared in a virtual manner between the data reproduction device 1 connected to a node A5a, PLC2 connected to a node B5b, the input and output unit 3 connected to a node C5c, and the HMI 4 connected to a node D5d. In the common memory, the memory areas (addresses) of the individual pieces of data are allocated. The devices connected to the individual nodes are allowed to perform transmission and reception of data by writing to and reading the data from the common memory.

In addition, the HMI 4 and the first monitoring camera 6 are connected via an image signal line 8 to the image data converter 9. The image output displayed on the screen of the HMI 4 and the image output of the first monitoring camera 6 are converted by the image data converter 9 into signals suitable for network communications and transmitted via a video network 10 to the data reproduction device 1. Also, the second monitoring camera 7 is a network camera, and the video data in which the object whose image is to be obtained is captured is transmitted via the video network 10 to the data reproduction device 1.

The input and output signals of the PLC2 and the input and output unit 3 are referred to as process data (character data, numerical data). The process data includes various pieces of data regarding a group of devices constituting the industrial plant and the materials to be processed by the group of devices. For example, the process data incudes control values for actuators, detected values of sensors, material specifications, and the like. A large-scale plant such as a steel plant has thousands of or tens of thousands of input and output points, and numerous and various pieces of process data are involved. These pieces of process data are collected by the data reproduction device 1 which has a data collection function and a data reproduction function, and used in data analysis in tests, adjustments, and operations, or in the event of a failure.

Next, the specific example of the industrial plant according to the first embodiment will be described. Steel plant is one of the industrial plants that produce materials and resources required in industrial activities. In a hot rolling line of the steel plant, a heating furnace, a roughing mill, a finishing mill, a run-out table, and a coiler are arranged, starting from the upstream of the line. The finishing mill includes a plurality of rolling stands, and rolls a material to be rolled in a single direction from the upstream to the downstream. By finish rolling, the final quality associated with the dimensions such as the thickness, widths, etc. of the material to be rolled are determined.

Figure 2:
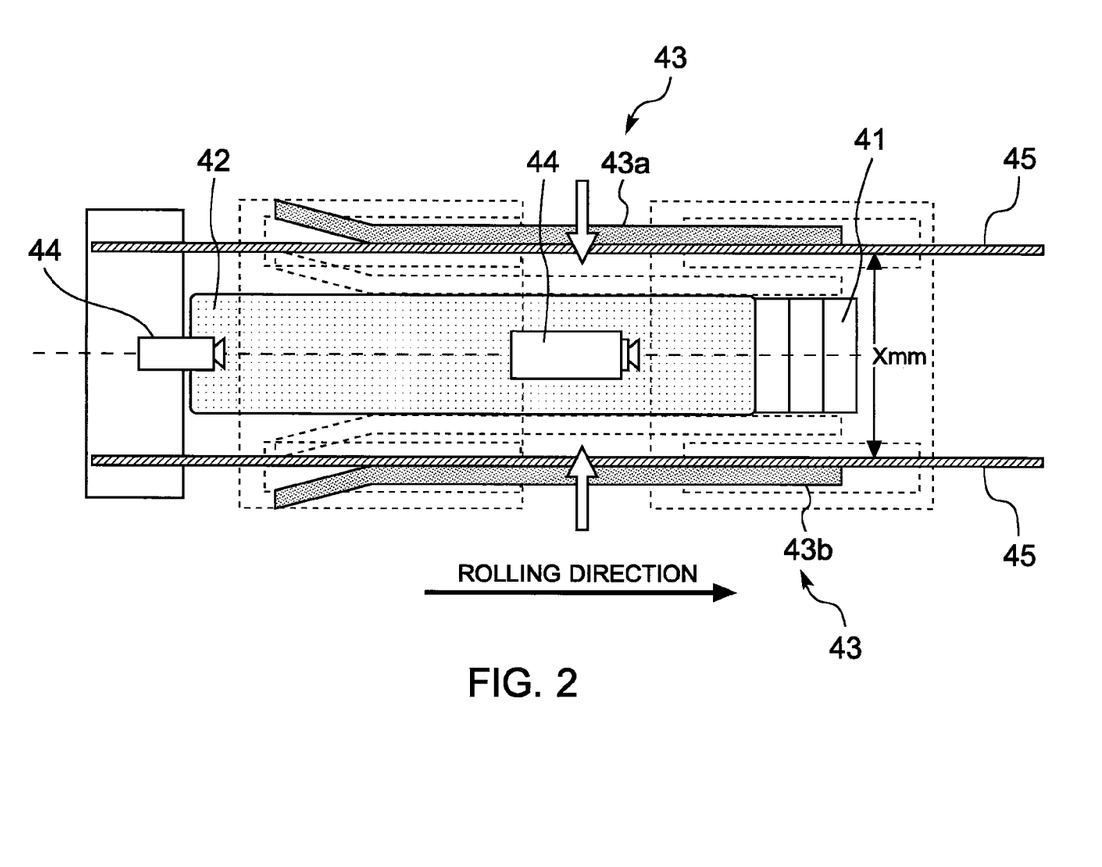
FIG. 2 is a schematic diagram that illustrates features of a side guide and a monitoring camera arranged at an entry side of a finishing mill.

FIG. 2 is a schematic diagram that illustrates features of a side guide and a monitoring camera arranged at an entry side of the finishing mill.

The roller table 41 conveys the material to be rolled 42 which is a material from the upstream (the left in FIG. 2) to the downstream (the right in FIG. 2) of the hot rolling line.

The side guide 43 is arranged in a certain section of the roller table 41 so as to guide the material to be rolled 42 passing the certain section to adjust its position in a width direction. The side guide 43 is configured to open and close a pair of side guide members 43a, 43b in parallel with each other. After the side guide members 43a, 43b are opened with an appropriate interval created therebetween and the material to be rolled 42 are guided into between the side guide members, the side guide members 43a, 43b are quickly closed and position correction is performed on the material to be rolled 42.

From the viewpoint of controllability, it is preferable that the interval between the side guide members 43a, 43b be controlled every time the material to be rolled 42 reaches the entry side of the above-described side guide, such that the interval is slightly wider than the width of the material to be rolled 42. For example, if the width is 1.8 m, then an interval of 1.85 m should be provided. In order to guide the materials to be rolled 42 having various widths with high controllability, the interval between the side guide members is changed in accordance with the widths of the materials to be rolled 42.

The monitoring camera 44 captures an image of a side guide 43 which is the object whose image is to be obtained and outputs video data. The monitoring camera 44 is either or both of the above-described first monitoring camera 6 and second monitoring camera 7. The monitoring camera 44 captures an image of a range including the side guide 43 from above the roller table 41.

In this configuration, the data reproduction device 1 according to the first embodiment includes the following features for assisting the operation by an operator to confirm the position of the side guide 43.

Data Reproduction Device

Figure 3:
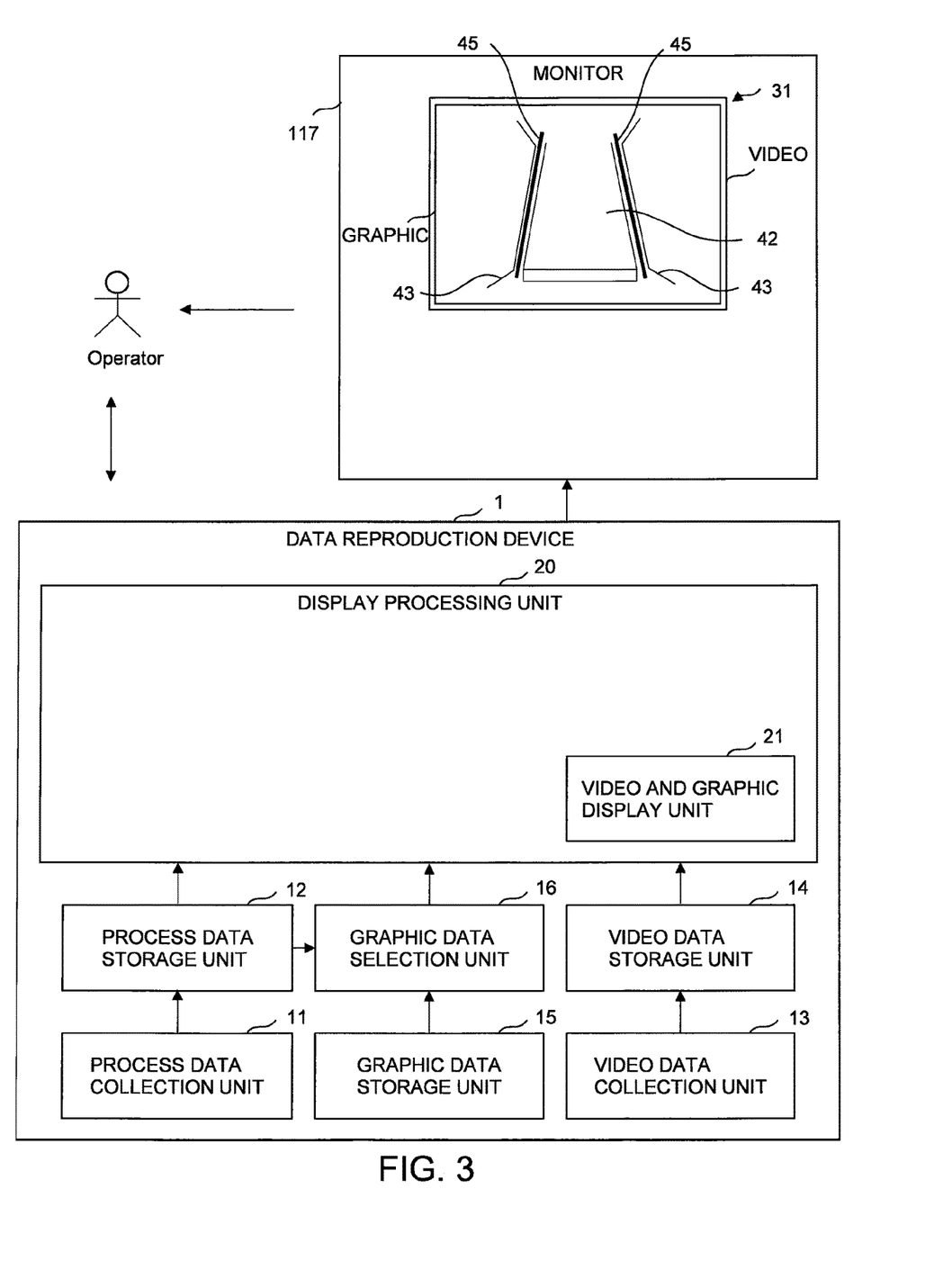
FIG. 3 is a functional block diagram of the data reproduction device according to the first embodiment.

FIG. 3 is a functional block diagram of the data reproduction device 1 according to the first embodiment. The data reproduction device 1 includes a process data collection unit 11, a process data storage unit 12, a video data collection unit 13, a video data storage unit 14, a graphic data storage unit 15, a graphic data selection unit 16, and a display processing unit 20.

The process data collection unit 11 collects the process data regarding the group of devices constituting the industrial plant and the materials to be processed by the group of devices. Specifically, the process data collection unit 11 collects various pieces of process data flowing in the control network 5 for each control period. The process data collection unit 11 adds a data collection time to the process data and outputs it to the process data storage unit 12.

Figure 4:
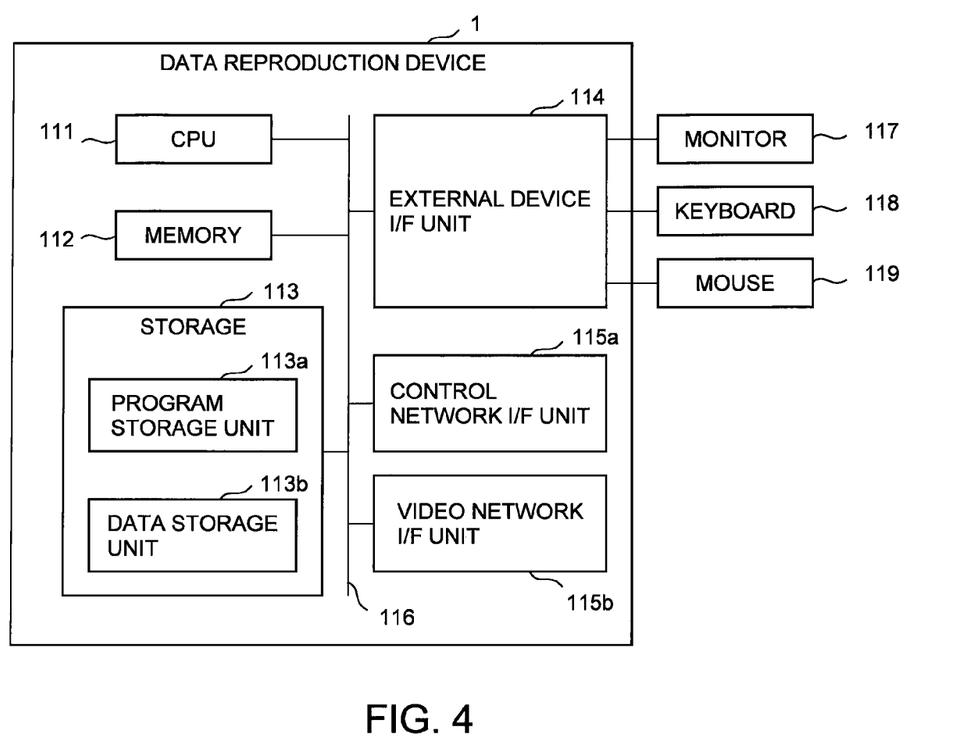
FIG. 4 is a block diagram that illustrates an example of a hardware configuration of a processing circuit provided in the data reproduction device.

The process data storage unit 12 accumulates various pieces of process data at each time point in the data storage unit 113b of a storage 113 (FIG. 4).

The video data collection unit 13 collects video data in which an object whose image is to be obtained is captured, the object pertaining to the group of devices. Specifically, the video data collection unit 13 collects the video data for each control period, via the video network 10, from the screen of the HMI 4, the first monitoring camera 6, and the second monitoring camera 7. The video data collection unit 13 adds a data collection time to the video data and outputs it to the video data storage unit 14.

The video data storage unit 14 accumulates the video data at each time point in the data storage unit 113b of the storage 113 (FIG. 4).

The graphic data storage unit 15 stores in advance graphic data indicative of the motion target position of the object whose image is to be obtained for each material specification. The graphic data includes characters, points, lines, circles, planes, and scale lines, etc. Specifically, the graphic data storage unit 15 stores in advance the graphic data (data in which the line 45 of FIG. 2 is represented) indicative of the motion target position (calibration position) of the side guide 43 for each of the widths of the materials to be rolled 42. In other words, the line 45 which varies depending on the widths of the materials to be rolled 42 is defined in each piece of graphic data. The graphic data storage unit 15 accumulates the individual pieces of graphic data in the data storage unit 113b of the storage 113 (FIG. 4).

Every time each of the materials reaches the object whose image is to be obtained, the graphic data selection unit 16 selects, from the graphic data storage unit 15, the graphic data that corresponds to the material specifications included in the process data for the time point. Specifically, at the time when each of the materials to be rolled 42 reaches the entry side of the side guide 43, or prior to this time, the graphic data selection unit 16 selects, from the graphic data storage unit 15, the graphic data (data in which the line 45 of FIG. 2 is represented) corresponding to the width of the next material to be rolled 42 that will pass the side guide 43, where the width is included in the process data.

The display processing unit 20 includes a video and graphic display unit 21. The video and graphic display unit 21 outputs synthetic data in which the graphic data selected by the graphic data selection unit 16 is overlaid on the video data. The line 45 which indicates the motion target position of the side guide 43 defined to be slightly wider than the width of the next material to be rolled 42 that will pass the side guide 43 is drawn in the graphic data selected by the graphic data selection unit 16. The synthetic data, in which this graphic data is overlaid on the video data captured by the monitoring camera 44, is displayed in the video and graphic display area 31 of the monitor 117.

The display positions and the display sizes of the video data and the graphic data are determined in conjunction with movement, enlargement, and reduction of the video and graphic display area 31. As a result, the video data and the graphic data are always displayed with the same size in an overlaid state.

As described above, according to the data reproduction device 1 in accordance with the first embodiment, every time a new material to be rolled 42 reaches the entry side of the side guide 43, the graphic data indicative of the line 45 (the motion target position of the side guide 43) corresponding to the width of this material to be rolled 42 is selected. Then the synthetic data in which the graphic data selected is overlaid on the video data is displayed on the monitor 117. Since the line 45 is updated in accordance with the widths of the materials to be rolled 42, the operator can readily and precisely determine, based on the video displayed on the monitor 117, whether or not the position of the side guide 43 coincides with the line 45 which is the motion target position. Hence, the data reproduction device 1 can assist the operation by the operator to confirm the position of the side guide 43. Also, since no special sensor is used, the data reproduction device 1 can assist the operation at low cost.

In the meantime, the data reproduction device 1 of the above-described first embodiment can display the video data in real time, and the video data stored in the video data storage unit can be reproduced starting from any specified time point. It is possible to facilitate recognition of the positions and sizes associated with past events and enhance the precision of confirmation of the positions and the sizes. In addition, it is also possible to stop, fast-forward, or rewind the video. Note that this point will also apply to the following embodiments.

In addition, the data reproduction device 1 of the above-described first embodiment may further include a graphic data editing unit that can add and edit the graphic data. Note that this point will also apply to the following embodiments.

In addition, in the data reproduction device 1 of the above-described first embodiment, while the graphic data is overlaid on the video data captured by the first monitoring camera 6 or the second monitoring camera 7, this does not constitute a limitation. The graphic data may be overlaid on the video data of the screen displayed in the HMI 4. Note that this point will also apply to the following embodiments.

In addition, although the data reproduction device 1 of the above-described first embodiment does not include a monitor 117, a keyboard 118, or a mouse 119 depicted in FIG. 4 which will be described later, they may be included in the data reproduction device 1. Note that this point will also apply to the following embodiments.

Hardware Configuration Example

The hardware configuration of the data reproduction device 1 will now be described with reference to FIG. 4. FIG. 4 is a block diagram that illustrates an example of a hardware configuration of processing circuit included in the data reproduction device 1. The individual units of the data reproduction device 1 depicted in FIG. 3 represent part of the functionality of the data reproduction device 1, and the individual functions are implemented by the processing circuit. For example, the processing circuit is configured by a CPU 111, a memory 112, a storage 113 such as an HDD and a large-capacity memory, an external device I/F (interface) unit 114, a control network I/F unit 115a, and a video network I/F unit 115b, which are connected via an internal bus 116.

The CPU 111 implements the functions of the individual units of FIG. 3 by running the various application programs stored in the program storage unit 113a of the storage 113.

The memory 112 is used as a calculation or operation area in which data is temporarily stored and deployed when the CPU 111 runs the various application programs.

The storage 113 has a program storage unit 113a and a data storage unit 113b. The program storage unit 113a stores an operating system (OS) and various application programs. Also, the data storage unit 113b stores the process data and video data that have been collected. In addition, the data storage unit 113b stores the graphic data.

Note that, while the program storage unit 113a and the data storage unit 113b are provided in one single storage 113 in the example illustrated in FIG. 4, the program storage unit 113a and the data storage unit 113b may be separately arranged in multiple storages.

The external device I/F unit 114 is an interface for connecting the external devices such as the monitor 117, the keyboard 118, the mouse 119 to the data reproduction device 1.

The control network I/F unit 115a is an interface for connecting the control network 5 and the data reproduction device 1. Also, the video network I/F unit 115b is an interface for connecting the video network 10 and the data reproduction device 1.

Second Embodiment

Next, the second embodiment will be described with reference to FIG. 5. According to the data reproduction device of the above-described first embodiment, it is possible to assist the operation by an operator to confirm the position of the side guide 43. In the second embodiment, a data reproduction device will be described which can assist the operation to confirm a motion position of a crop shear.

Figure 5:
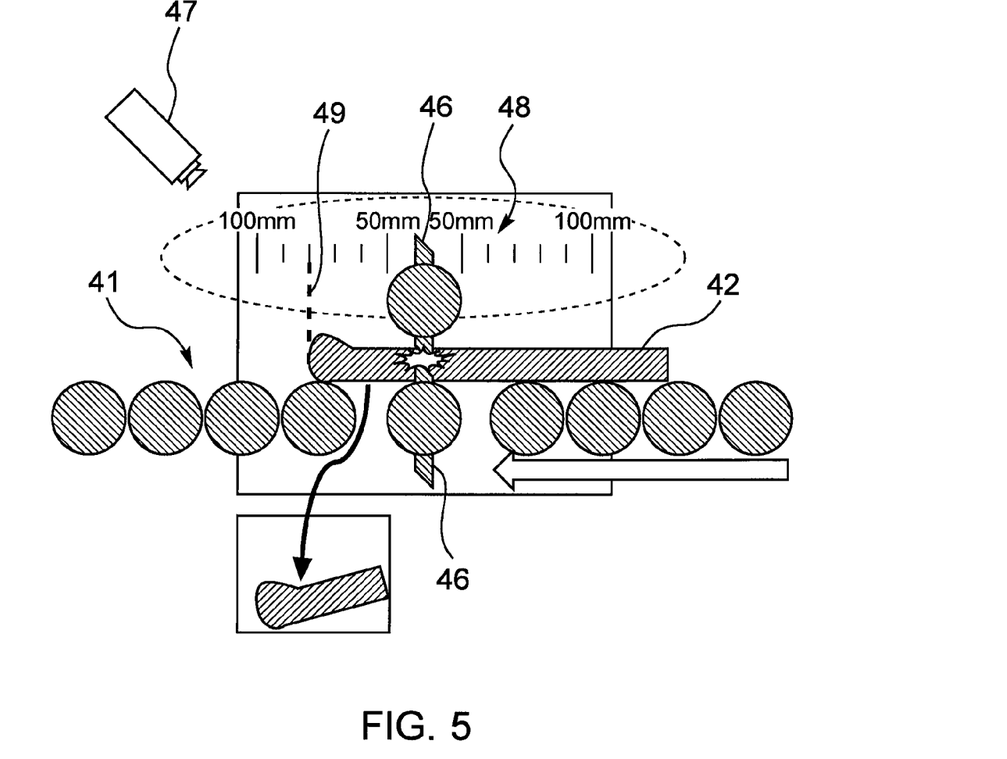
FIG. 5 is a schematic diagram that illustrates a configuration of a crop shear and a monitoring camera arranged at an entry side of a finishing mill.

FIG. 5 is a schematic diagram that illustrates a configuration of the crop shear and a monitoring camera arranged at an entry side of a finishing mill.

The roller table 41 conveys the material to be rolled 42 which is a material from the upstream (the right in FIG. 5) to the downstream (the left in FIG. 5) of the hot rolling line.

The crop shear 46 is arranged in a certain section of the roller table 41 so as to cut an end in the length direction of the material to be rolled 42 passing the certain section in the width direction. The crop shear 46 is a device for sharing a crop (defective shape portion, irregular portion) of the head and tail ends of the material to be rolled 42 prior to the finish rolling and shaping it into a substantially rectangular planar shape into which the finishing mill readily bites.

The monitoring camera 47 captures the images of the crop shear 46 which is the object whose images is to be obtained and the material to be rolled 42 passing the crop shear 46, and outputs the video data. The monitoring camera 47 is either or both of the above-described first monitoring camera 6 and second monitoring camera 7. The monitoring camera 47 captures, at the time of operation of the crop shear 46, in the width direction, an image of the range where the crop shear 46 and the head and tail ends of the material to be rolled 42 are included.

In this configuration, the data reproduction device 1 according to the second embodiment includes the following features for assisting the operation by the operator to confirm the motion position of the crop shear.

Data Reproduction Device

The features of the data reproduction device 1 in the second embodiment are identical with those illustrated in the first embodiment except that the above-described graphic data stored in the graphic data storage unit 15 of FIG. 3 and the processing timing at the graphic data selection unit 16 are different, and accordingly explanations of the corresponding features will not be repeated or only presented in a simplified manner.

The graphic data storage unit 15 stores in advance graphic data indicative of the motion target position of the crop shear 46 for each of the target cut lengths of the materials to be rolled 42. The target cut length is the length by which the crop of the head and tail ends is to be removed, where the length is defined for each of the materials to be rolled 42. The graphic data includes a scale 48 provided in the length direction of the material to be rolled 42 with the shear position by the crop shear 46 as its center, and a line 49 indicative of the positions of the head and tail ends corresponding to the target cut length depicted in FIG. 5. In the example illustrated in FIG. 5, the position at which the head end of the material to be rolled 42 has reached the line 49 is the motion target position of the crop shear 46. The graphic data storage unit 15 accumulates the individual pieces of graphic data in the data storage unit 113b of the storage 113 (FIG. 4).

Every time each of the materials to be rolled 42 reaches the entry side of the crop shear 46, the graphic data selection unit 16 selects, from the graphic data storage unit 15, the graphic data included in the process data for the time point corresponding to each of the target cut lengths of the next materials to be rolled 42 which will pass the crop shear 46 (data indicative of the scale 48 and the line 49 of FIG. 5).

The display processing unit 20 includes a video and graphic display unit 21. The video and graphic display unit 21 outputs synthetic data in which the graphic data selected by the graphic data selection unit 16 is overlaid on the video data. The synthetic data is displayed in the video and graphic display area 31 of the monitor 117. When the head end of the material to be rolled 42 is shorn, the line 49 is indicated on the downstream side relative to the crop shear 46 and, when the tail end thereof is shorn, the line 49 is indicated on the upstream side relative to the crop shear 46.

As described above, according to the data reproduction device 1 in accordance with the second embodiment, the graphic data is selected which is indicative of the scale 48 and the line 49 corresponding to the end in the length direction of the material to be rolled 42. In addition, the synthetic data in which the graphic data selected is overlaid on the video data is displayed on the monitor 117. Since the line 49 is updated depending on the target cut lengths of the material to be rolled 42, the operator can readily determine with high precision, based on the video displayed on the monitor 117, whether or not the crop shear 46 is operating at the timing at which the end in the length direction of the material to be rolled 42 reached the line 49 (at the motion target position). Also, the size of the head and tail ends of the material to be rolled 42 that has been cut can be confirmed by the scale 48. Hence, according to the data reproduction device 1, it is made possible to assist the operation by the operator to confirm the motion position of the crop shear 46. Also, since no special sensor is used, the operation can be assisted at low cost.

In the meantime, the system of the above-described second embodiment can be implemented in combination with the system of the first embodiment. Note that this point will also apply to the following embodiments.

Third Embodiment

Next, the third embodiment will be described with reference to FIG. 6. In the above-described first embodiment or the second embodiment, by displaying the synthetic data in which the video data and the graphic data are overlaid on each other, it is made possible to assist the operation by the operator to confirm whether or not the device as the object whose image is to be obtained is operating at an appropriate position and an appropriate timing.

In the meantime, in some cases, in addition to the video data, the process data associated with the video data should be confirmed at the same time. In view of this, in the third embodiment, the synthetic data in which the video data and the graphic data are overlaid on each other and graph data which represents the process data in the form of a graph are to be displayed in synchronization with each other.

Figure 6:
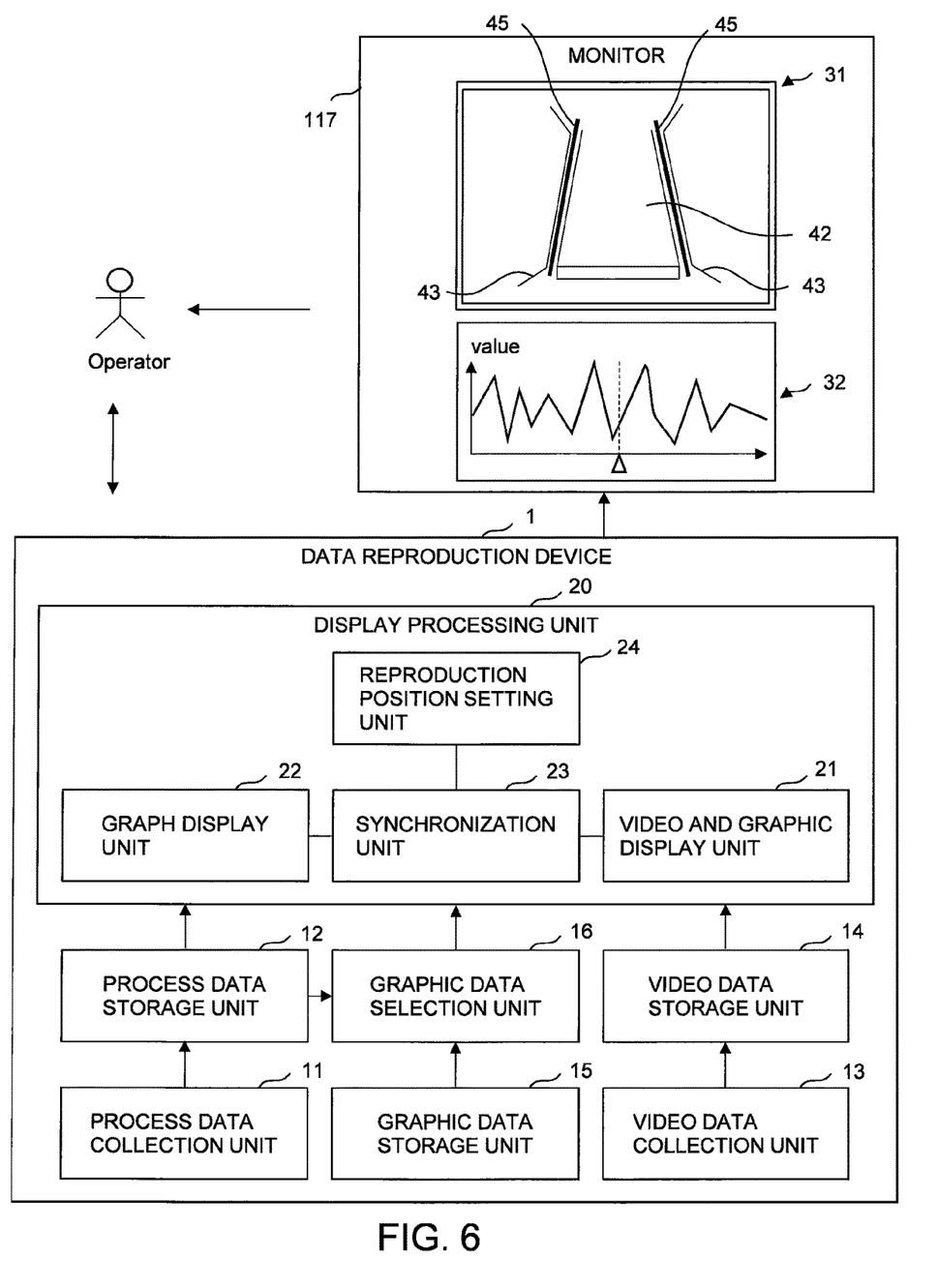
FIG. 6 is a functional block diagram of the data reproduction device according to a third embodiment.

FIG. 6 is a functional block diagram of the data reproduction device 1 according to the third embodiment. The features depicted in FIG. 6 are identical with those depicted in FIG. 3 except that the display processing unit 20 includes a graph display unit 22, a synchronization unit 23, and a reproduction position setting unit 24 and that a graph display area 32 is displayed on the monitor 117, and accordingly explanations of the corresponding features will not be repeated or only presented in a simplified manner.

The graph display unit 22 generates graph data indicative of the relationship between the process data stored in the process data storage unit 12 and the data collection time.

The synchronization unit 23 outputs the graph data that has been generated by the graph display unit 22 and the synthetic data that has been generated by the video and graphic display unit 21 in synchronization with each other. The synthetic data is displayed in the video and graphic display area 31 of the monitor 117, the graph data is displayed in the graph display area 32 of the monitor 117, and they are reproduced in synchronization with each other.

The reproduction position setting unit 24 sets the reproduction position (reproduction time point) of the data by the operation by the operator. The reproduction position that has been set is used as the start time of the synchronization by the synchronization unit 23.

As described above, according to the data reproduction device 1 in accordance with the third embodiment, the synthetic data in which the video data and the graphic data are overlaid on each other and the graph data that represents the process data in the form of a graph can be displayed in synchronization with each other. As a result, the data reproduction device 1 can assist the operation by the operator to confirm whether or not the device as the object whose image is to be obtained is operating at an appropriate position and an appropriate timing.

In the meantime, the system of the above-described third embodiment can be implemented in combination with the system of the first embodiment and the system of the second embodiment.

In addition, in the data reproduction device 1 of the above-described third embodiment, the graph data may be displayed with the graphic data overlaid thereon. For example, graphic data indicative of a line that defines a threshold for the detection values of the sensor may be displayed such that it is overlaid on the graph data.

Whilst the embodiments of the present invention have been described in the foregoing, the present invention is not limited to the above-described embodiments and can be implemented with various modifications made thereto within the range where the purport of the present invention is not deviated from.

REFERENCE SIGNS LIST

1 Data reproduction device
2 Programmable logic controller (PLC)
3 Input and output unit (I/O)
4 Human-machine interface (HMI)
5 Control network
6 First monitoring camera
7 Second monitoring camera
8 Image signal line
9 Image data converter
10 Video network
11 Process data collection unit
12 Process data storage unit
13 Video data collection unit
14 Video data storage unit
15 Graphic data storage unit
16 Graphic data selection unit
20 Display processing unit
21 Video and graphic display unit 22 Graph display unit
23 Synchronization unit
24 Reproduction position setting unit
31 Video and graphic display area
32 Graph display area
41 Roller table
42 Material to be rolled
43 Side guide
43a, 43b Side guide member
44, 47 Monitoring camera
45, 49 Line
46 Crop shear
111 CPU
112 Memory
113, 113a, 113b Storage, program storage unit, data storage unit
114 External device I/F unit
115a, 115b Control network I/F unit, video network I/F unit
116 Internal bus
117 Monitor
118 Keyboard
119 Mouse

The invention claimed is:

1. An industrial plant data reproduction device comprising:
one or more processors configured to:
collect process data regarding a group of devices constituting an industrial plant and materials to be processed by the group of devices;
collect video data in which an object whose image is to be obtained is captured, wherein the object pertains to the group of devices, and wherein a motion target position of the object changes according to material specifications;
store in advance graphic data for each material specification, wherein the graphic data indicates the motion target position of the object whose image is to be obtained;
select the stored graphic data corresponding to the material specifications included in the process data every time each of the materials reaches the object whose image is to be obtained; and
output synthetic data in which the selected graphic data is overlaid on the video data, wherein
the industrial plant includes a roller table configured to convey a material to be rolled which is one of the materials, a side guide arranged in a certain section of the roller table configured to guide the material to be rolled passing the certain section to adjust its position in a width direction, and a monitoring camera configured to capture an image of the side guide when the side guide is the object whose image is to be obtained and output the video data, the one or more processors configured to:
store in advance graphic data indicative of a motion target position of the side guide for each of widths of the materials to be rolled; and
select the stored graphic data corresponding to the width of the next material to be rolled passing the side guide included in the process data every time each of the materials to be rolled reaches an entry side of the side guide; and
the industrial plant includes a crop shear arranged in a certain section of the roller table configured to cut an end in a length direction of the material to be rolled passing the certain section in a width direction, and a monitoring camera configured to capture an image of the crop shear when the crop shear is the object whose image is to be obtained and the material to be rolled passing the crop shear and output the video data, the one or more processors configured to:
store in advance graphic data indicative of a motion target position of the crop shear for each of target cut lengths of the materials to be rolled; and
select the stored graphic data corresponding to the target cut length of the next material to be rolled passing the crop shear included in the process data every time each of the materials to be rolled reaches an entry side of the crop shear.

2. The industrial plant data reproduction device according to claim 1, wherein
the one or more processors configured to:
generate graph data representing a relationship between the process data and a data collection time; and
output the graph data and the synthetic data in synchronization with each other.

* * * * *